Patented June 5, 1923.

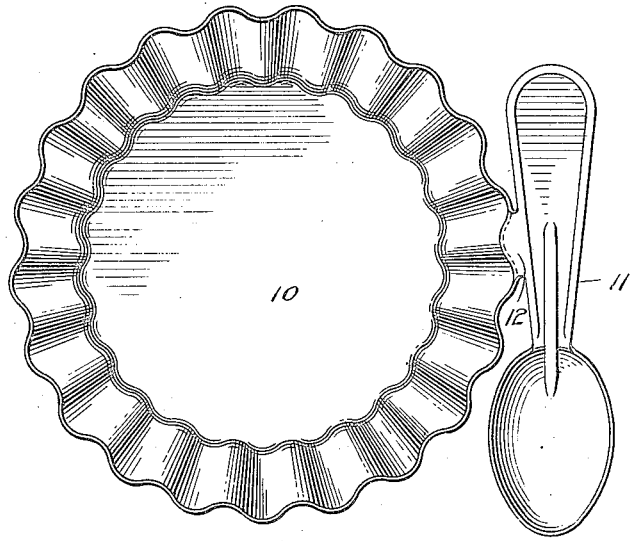
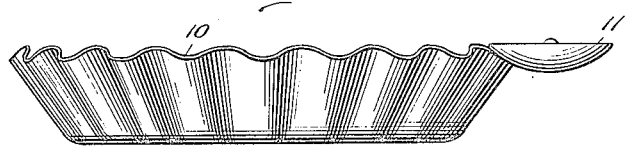
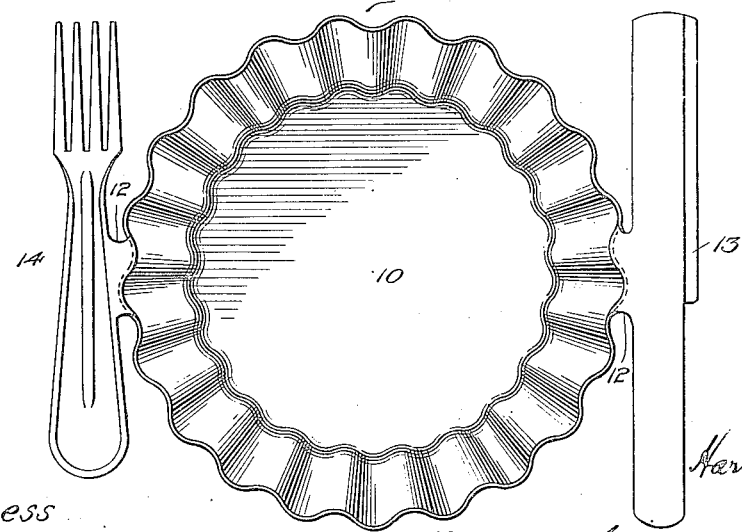

1,457,998

UNITED STATES PATENT OFFICE.

HARRY G. NORWOOD, OF BALTIMORE, MARYLAND.

TABLE ARTICLE.

Application filed August 12, 1920, Serial No. 402,981. Renewed November 8, 1922. Serial No. 599,725.

*To all whom it may concern:*

Be it known that I, HARRY G. NORWOOD, a citizen of the United States, residing in the city of Baltimore, State of Maryland, have invented certain new and useful Improvements in Table Articles; and I do hereby declare the following to be a full, clear, and exact description of the same, reference being had to the accompanying drawings, forming part of this specification.

This invention relates to table articles and more particularly to containers or receptacles for articles of food, said containers having one or more eating implements, such as spoons, forks or knives attached thereto for handling or dispensing the food. More especially the invention contemplates the provision of a plate or saucer like container and a spoon or other appropriate implement formed integrally therewith, the article being formed of an inexpensive material and particularly adapted for use by proprietors of ice cream parlors and by picnic or camping parties where it is desirable that the article may be destroyed or thrown away after use.

One object of the present invention is to construct the container and the implement from a single piece of material, the implement being formed integrally with, but detachable from, the container. This facilitates handling of the containers and implements and insures the presence of the implement when the container is to be used.

A further object is to construct the articles of such form that they can be nested one within the other, this feature being particularly advantageous in packing and transporting or storing a large quantity of the articles.

In the accompanying drawings

Figure 1 is a plan view of a plate or saucer like container with an attached implement, such as a spoon, formed integrally therewith.

Fig. 2 is a side view of the article shown in Fig. 1.

Fig. 3 is a plan view of a plate or saucer or like container with two implements, such as a knife and fork, formed integrally therewith.

While the container or receptacle shown in the accompanying drawings is of plate or saucer like form, and will be so described, it will be understood that the invention is applicable to containers of various forms.

The container or receptacle 10, of whatever shape, is formed from any suitable fibrous or plastic material such as papier mâché or cardboard or any other comparatively inexpensive material, the article being designed to be used but once and then destroyed or thrown away. Formed integrally with the container 10 is an implement such as a knife, or a fork, or as shown in Fig. 1, a spoon 11. The spoon 11 while formed integrally with the container 10, is attached to the side wall of said container by a comparatively narrow strip of material 12 whereby the implement may be readily separated from the container by the user. The convenience and advantages of having the container and implement formed integrally will be appreciated by those accustomed to providing the dining facilities of picnic or camping parties and by proprieters of ice cream parlors or the like who are called upon, at times, to quickly serve a large number of persons.

To facilitate the packing of the containers for transportation, the side walls of the containers or receptacles 10 are preferably flared to permit the articles to be nested one within the other, the attached implements also nesting together, as will be readily understood. The sides of the containers are also fluted, as shown in the drawings, as the indentations or corrugations prevent relative movement of the articles when nested together, thus maintaining the implements in alinement.

In carrying out the present invention a blank of desired shape is cut from a sheet of material and then placed between dies of proper design to shape the blank up to the desired form. When papier mâché is utilized the articles may, if desired, be molded.

The article shown in Fig. 3 is similar in construction to that shown in Figs. 1 and 2, differing only in that the container 10 is provided with two integrally formed implements such as a knife 13 and a fork 14, these two implements being appropriate accompaniments for the plate like container.

What is claimed is:

1. A new article of manufacture comprising a container and an implement, such as a fork, spoon or the like, said container and implement being formed integrally with one another.

2. A new article of manufacture comprising a plate or like container of fibrous material and an eating implement of similar material, whereby said container and implement may be destroyed after use, said implement being formed integrally with but detachable from said container.

3. As a new article of manufacture, a table article comprising a plate-like container and food dispensing means connected thereto, the connection between the container and food dispensing means being adapted to be ruptured whereby said food dispensing means may be disconnected from the container.

4. A new article of manufacture comprising a plate or saucer like container and an implement attached to but separable from said container, said implement being attached to said container by a strip of material provided with a line of weakness to facilitate separation of the container and implement.

HARRY G. NORWOOD.